United States Patent [19]

Kawai

[11] 3,849,613

[45] Nov. 19, 1974

[54] TURN SIGNAL SWITCH APPARATUS FOR MOTOR VEHICLE

[75] Inventor: Yoshihiro Kawai, Aichi, Japan

[73] Assignee: Kabushiki Kaisha Tokai-Rika-Denki-Seisakusho, Nishikasugai-Gun, Aichi-Pref., Japan

[22] Filed: Sept. 26, 1973

[21] Appl. No.: 401,010

[30] Foreign Application Priority Data
Sept. 28, 1972 Japan.......................... 47-112869

[52] U.S. Cl. .......................................... 200/61.27
[51] Int. Cl. ............................................. H01h 3/16
[58] Field of Search.......... 200/61.27, 61.35, 61.54, 200/61.55; 74/504

[56] References Cited
UNITED STATES PATENTS

| | | | |
|---|---|---|---|
| 2,817,728 | 12/1957 | Gurney | 200/61.27 X |
| 2,863,013 | 12/1958 | Brown et al. | 200/61.54 X |
| 3,209,092 | 9/1965 | Vitaloni et al. | 200/61.54 X |
| 3,510,839 | 5/1970 | Elliott et al. | 200/61.27 X |
| 3,671,691 | 6/1972 | Suzuki et al. | 200/61.27 X |

*Primary Examiner*—James R. Scott
*Attorney, Agent, or Firm*—Pollock, Philpitt & Vande Sande

[57] ABSTRACT

A turn signal switch apparatus for a motor vehicle mounted on the steering column for manual operation by the driver, comprises a housing body with a transverse base wall and an actuating member mounted pivotably on the base wall in the housing body and connected to a turn signal switch lever. The actuating member is integrally provided with a stopper tongue which extends through an opening formed in the transverse base wall and abuts against the lower side of an upstanding guide rib provided on the base wall, whereby preventing the distal portion of the actuating member from being raised during repeated pivotal movements of the member.

1 Claim, 4 Drawing Figures

PATENTED NOV 19 1974

3,849,613

TURN SIGNAL SWITCH APPARATUS FOR MOTOR VEHICLE

BACKGROUND OF THE INVENTION

1. Field of the Invention

This invention relates to a turn signal switch apparatus for a motor vehicle, and more particularly to an improvement on the structure of a turn signal switch apparatus of the type described which is usually mounted on the steering column of the vehicle and adapted for manual operation by the driver.

2. Prior Art

Conventionally, such turn signal switch apparatus for selectively flashing left and right vehicle signal lamps for direction signaling purposes has an actuating mechanism comprising a substantially cylindrical housing body with a transverse base wall integrally formed therein, a pivotable actuating member which is pivotally supported within and by the housing body, and a turn signal switch lever connected to the actuating member and extending outwardly from the housing body. The pivotable actuating member is adapted to effect horizontal angular movement around its pivot post received in a hole formed on the transverse base wall which serves as a guide surface for the actuating member. Through manual operation of the switch lever by the driver, the actuating member pivots into left and right positions alternatively from a neutral position with a snap action attainable by resilient biasing means provided on the actuating member and a portion of the housing body. As the actuating member pivots into the left and right positions, left and right flasher lamp circuits are electrically closed, respectively, through the action of a change-over contact switch element, thus attaining direction signaling purposes.

In the prior art structure of the turn signal switch apparatus described above, however, there have occurred problems that in repeated operation of the apparatus, the distal end portion of the actuating member disadvantageously tends to be lifted upwardly from its horizontal plane of pivotal movement because of a relatively great length of the turn signal switch lever extending between the pivot of the actuating member and the grip of the lever, and also of rough handlings of the lever frequent by the driver. This results in malfunction or unsteady operation of the change-over contact switch element. To avoid this problem, it is a common practice in the ordinary apparatus that a retainer member is additionally employed as attached to the housing body crossing over the distal end portion of the actuating member so as to prevent the same portion from being raised during its pivotal movement. However, the use of such a retainer member adds to complexities as well as extra costs in the assembly work of the turn signal switch apparatus, since actually not a few of attempts and improvements have hitherto been made in the art of designing the apparatus to decrease the number of parts involved, simplify the assembling and hence reduce its cost.

SUMMARY OF THE INVENTION

This invention, therefore, is directed to eliminate the above prior art drawbacks without the necessity of employing a retainer member by providing an improvement on the conventional structure of a turn signal switch apparatus of the type described, the improvement being attainable in a simple and inexpensive manner.

According to the invention, there is provided a turn signal switch apparatus for use in a motor vehicle wherein a pivotable actuating member is integrally formed with a stopper tongue which extends toward an upstanding guide rib from the distal end portion of the actuating member for abutting engagement with a guide surface formed on the upstanding guide rib, whereby preventing the distal portion of the actuating member from being raised during repeated pivotal movement of the member.

The invention will now be described of its preferred embodiment in conjunction with the accompanying drawings.

DESCRIPTION OF THE PRESENTLY PREFERRED EMBODIMENT

Figure 1:
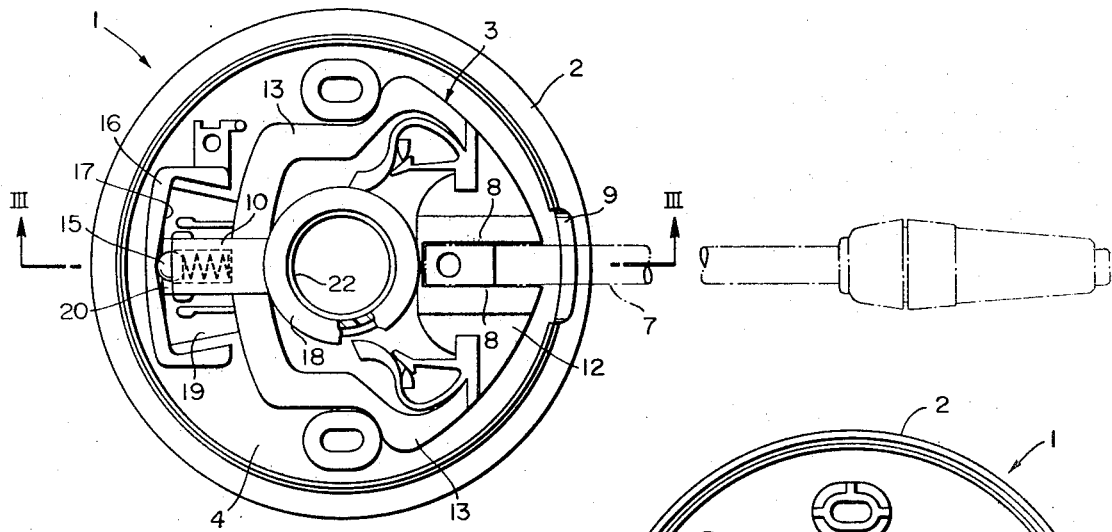
FIG. 1 is a top view of the apparatus according to the invention showing how the parts are in operative association with one another when assembled.
Figure 3:
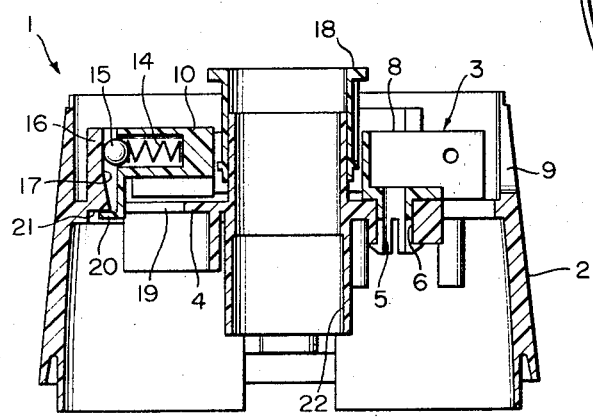
FIG. 3 is a longitudinal section taken along the line III—III of FIG. 1 showing also the essential feature of the invention.
Figure 4:
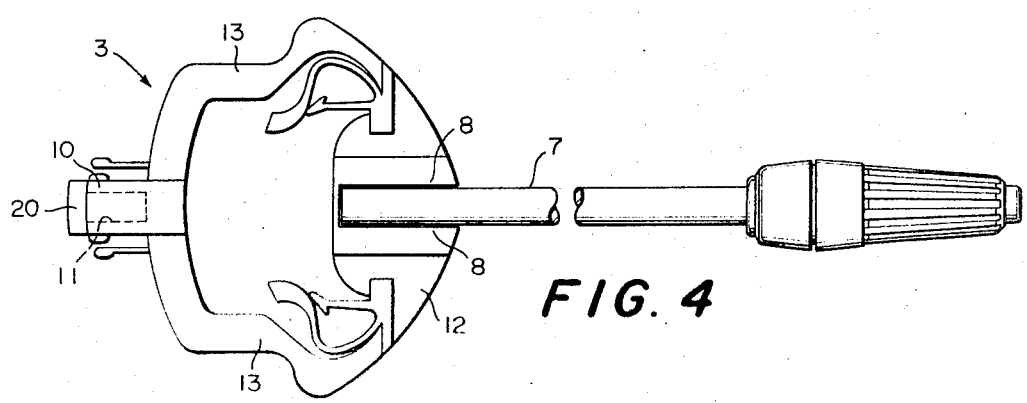
FIG. 4 is a top view of a pivotable actuating member to be incorporated in the apparatus.

Referring now to the drawings wherein all of electrical parts and circuits have been omitted for brevity of description since they do not constitute essential parts of the invention, and especially to FIGS. 1 and 3, the apparatus generally indicated at 1 includes: a substantially cylindrical housing body 2 having a transverse base wall 4 formed integrally with and within the housing body; and a pivotable actuating member generally indicated at 3 which is supported pivotally around its integral pivot post 5 received in a hole 6 formed on the transverse base wall 4. The pivotable actuating member 3 connects at its proximal end a turn signal switch lever 7 which is fixedly secured in a recess groove 8 formed on the proximal portion 12 of the actuating member, the lever 7 extending outwardly through a cut opening 9 provided on the housing body 2.

The pivotable actuating member 3 is such shaped that at the distal portion, where two arms 13, 13 extending from the proximal portion 12 join with each other, is provided a projection 10 having a bore 11 in which a spring 14 loaded steel ball 15 is accommodated. In faced relation to the projection 10, is provided an upstanding guide rib 16 extending integrally from the transverse wall 4 of the housing body. This upstanding guide rib 16 constitutes a V-shaped guide surface 17 which is adapted for resilient engagement with the spring loaded steel ball 15 carried by the actuating member 3. It is noted that the housing body and the actuating member are preferably made of suitable synthetic resin by mold-forming process.

In operation of the above described ordinary apparatus which has been mounted on the steering column tube assembly with a central guide hole 22 with a sleeve 18 receiving the steering shaft therethrough, it is intended that as the grip end of the lever 7 is horizontally angularly moved, the actuating member 3 is caused to pivot so that the projection 10 moves with a snap action from the neutral position, whereat the spring loaded steel ball 12 is in contact with the central bottom point of the V-shaped guide surface 17, to the left or right position, due to the resilient biasing means consisting of the spring loaded steel ball and the V-shaped guide surface.

Thus, the above movement of the projection of the actuating member attains alternative closing of not-shown left and right flasher lamp circuits. Also, as is known, it is arranged that the actuating member is automatically returned to the neutral position by means of a not-shown canceling cam arrangement movable with the steering apparatus when the turn is completed.

Figure 2:
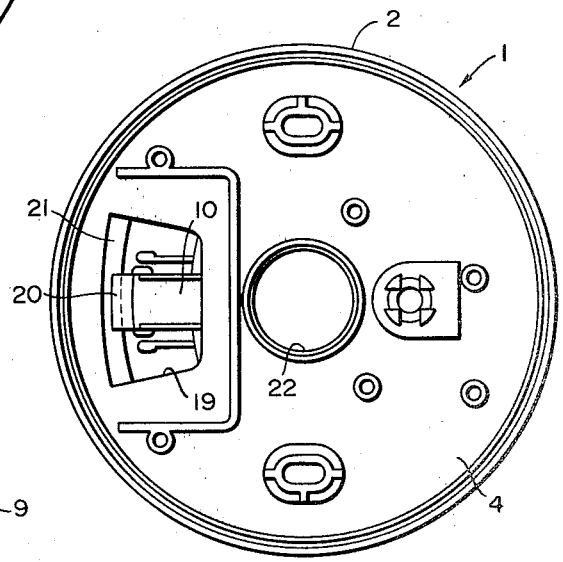
FIG. 2 is a bottom view of the apparatus of FIG. 1 showing the essential feature of the invention.

According to the invention applicable to the structure of the conventional turn signal switch apparatus described above, the transverse base wall 4 is provided, adjacent the upstanding guide rib 16, with an elongated opening 19 which extends over the length corresponding to the angular sweep of the movable projection 10. (See FIG. 2.) Also, the projection 10 of the actuating member 3 is integrally formed with a stopper tongue 20 which extends downwardly through the opening 19 from the end bottom of the projection and which then is turned outwardly horizontally so that the stopper tongue 20 abuts against a guide surface 21 formed on the lower side of the upstanding guide rib 16.

With the above arrangement according to the invention, therefore, it will be appreciated that the pivotable actuating member of the apparatus accomplishes desirous movement substantially on the horizontal plane without risks of its distal portion being raised during the long repeated use of the apparatus even by a rough driver, due to the fact that throughout the pivotal movement of the actuating member the stopper tongue 20 is kept in abutting engagement with the guide surface 21 of the upstanding guide rib 16 in the housing body. Hence, the invention may eliminate any difficulties of malfunction or unsteady operation in the associated electrical elements that have occurred in the prior art apparatus. Further, the invention is advantageous in that such an additional retainer member as common in the ordinary apparatus may be omitted. Still further, another advantage offered by the invention is that in the assembly process of the apparatus, the stopper tongue formed integral with the actuating member may easily be put in through the opening on the transverse base wall to be positioned in engagement with the guide surface of the upstanding rib, thanks to the resilient character of the stopper tongue, while the pivot post being inserted into the receiving hole on the transverse base wall.

It will be noted that the invention is in no way limited to the particular embodiment described in the foregoing but other modifications and substitutions may be occurred to those skilled in the art without departing from the spirit of the appended claim. For example, the stopper tongue may extend from any suitable portion of the projection other than the extreme edge, or may be curved in its section.

I claim:

1. In a turn signal switch apparatus for a motor vehicle of the type which includes a substantially cylindrical housing body with an integral transverse base wall extending horizontally therein and a pivotable actuating member mounted within said housing body for horizontal pivotal movement on the transverse base wall caused by external manipulation of a turn signal switch lever connected to said actuating member by a driver of a motor vehicle, said horizontal pivotal movement of the actuating member being conducted through elastic engagement between a distal projection of said member and an upstanding guide rib formed on and integral with the transverse base wall, the improvement comprises: an elongated opening formed in the transverse base wall adjacent the upstanding guide rib and beneath the distal projection, said opening extending over a length corresponding to the angular sweep of the distal projection; a stopper tongue integrally formed with the actuating member, said stopper tongue extending toward the upstanding guide rib from the distal end portion of the actuating member; and a guide surface provided on said upstanding guide rib in cooperating relationship with the stopper tongue, so that stopper tongue keeps abutting engagement with said guide surface, whereby preventing the distal portion of the actuating member from being raised during repeated pivotal movements of the member.

* * * * *